US009623796B2

(12) United States Patent
Takahashi et al.

(10) Patent No.: US 9,623,796 B2
(45) Date of Patent: Apr. 18, 2017

(54) VEHICLE LAMP

(71) Applicant: KOITO MANUFACTURING CO., LTD., Tokyo (JP)

(72) Inventors: Haruhito Takahashi, Shizuoka (JP); Koji Izukawa, Shizuoka (JP); Shigehiko Kazaoka, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 173 days.

(21) Appl. No.: 14/503,663

(22) Filed: Oct. 1, 2014

(65) Prior Publication Data
US 2015/0109808 A1 Apr. 23, 2015

(30) Foreign Application Priority Data

Oct. 17, 2013 (JP) ................................ 2013-216686

(51) Int. Cl.
*B60Q 1/26* (2006.01)
*F21S 8/10* (2006.01)
*B60R 1/12* (2006.01)

(52) U.S. Cl.
CPC .......... *B60Q 1/2665* (2013.01); *B60R 1/1207* (2013.01); *F21S 48/2237* (2013.01); *F21S 48/2262* (2013.01); *F21S 48/2281* (2013.01); *F21S 48/2268* (2013.01)

(58) Field of Classification Search
CPC ........................ F21S 48/2237; F21S 48/2262
See application file for complete search history.

(56) References Cited

U.S. PATENT DOCUMENTS

| 6,268,600 | B1 * | 7/2001 | Nakamura | G02B 6/0001 250/216 |
| 6,315,437 | B1 * | 11/2001 | Katz | B60Q 1/2665 340/475 |
| 7,777,955 | B2 * | 8/2010 | Cassarly | G02B 6/0008 359/546 |
| 8,469,563 | B2 * | 6/2013 | Hwang | B60Q 1/2665 340/475 |
| 8,845,156 | B2 * | 9/2014 | Fukasawa | B60Q 1/2665 362/140 |
| 2002/0057575 | A1 * | 5/2002 | Schwanz | B60Q 1/2665 362/487 |
| 2005/0146886 | A1 * | 7/2005 | Furuya | B60R 1/1207 362/494 |

(Continued)

FOREIGN PATENT DOCUMENTS

JP 2011054523 3/2011

*Primary Examiner* — Elmito Breval
*Assistant Examiner* — Zachary J Snyder
(74) *Attorney, Agent, or Firm* — Abelman, Frayne & Schwab

(57) ABSTRACT

The present disclosure provides a technology of achieving a compact configuration of efficiently guiding a light incident on an incident portion to an emitting portion. The vehicle lamp includes a light guide lens. The light guide lens includes an incident portion on which light is incident from the LEDs, an emitting portion which emits the incident light, and a main body portion which guides the light from the incident portion to the emitting portion. The incident portion has a larger width than the main body portion, and the emitting portion has a larger width than the main body portion.

10 Claims, 4 Drawing Sheets

(56) References Cited

U.S. PATENT DOCUMENTS

2008/0298059 A1* 12/2008 Schug .................... H01L 33/58
                                                      362/240
2010/0084667 A1*  4/2010 Mcfadden ................ F21K 9/00
                                                      257/88
2010/0309677 A1* 12/2010 Kazaoka .............. B60Q 1/2665
                                                      362/519
2011/0058385 A1*  3/2011 Kazaoka .............. B60Q 1/2665
                                                      362/540

* cited by examiner

VEHICLE LAMP

CROSS-REFERENCE TO RELATED APPLICATIONS

This application is based on and claims priority from Japanese Patent Application No. 2013-216686, filed on Oct. 17, 2013, with the Japan Patent Office, the disclosure of which is incorporated herein in its entirety by reference.

TECHNICAL FIELD

The present disclosure relates to a vehicle lamp.

BACKGROUND

A side turn signal lamp integrated with a side mirror of a vehicle has been known in the related art. The side turn signal lamp is provided inside an elongated opening formed in a housing of the side mirror.

Japanese Patent Laid-Open Publication No. 2011-54523 discloses a side turn signal lamp in which a light guide lens is disposed along an opening. In the side turn signal lamp, the light guide lens has a light incident end face on which a light emitted from an LED serving as a light source is efficiently incident, and a light emitting portion provided in the vicinity of the distal end portion at the front side of a main body of the light guide lens. The light emitting portion is configured such that a part of the light incident on the main body of the light guide lens is emitted to the oblique back side of the vehicle. The main body of the light guide lens is formed to have a thickness gradually decreasing from the base end side to the distal end side.

SUMMARY

From view of design, miniaturization and narrowing of a lamp has recently been requested. In this case, in order to achieve a light distribution required for the lamp, it is required to efficiently guide the light of a light source to an emitting portion. Therefore, a light guide body configuration is required to be further modified.

The present disclosure has been made in consideration of these circumstances, and an object thereof is to provide a technology of achieving a compact configuration of efficiently guiding a light incident on an incident portion to an emitting portion.

In order to solve the problem, according to an aspect of the present disclosure, a vehicle lamp includes a light guide body. The light guide body includes an incident portion on which light is incident from a light source, an emitting portion which emits the incident light, and a main body portion which guides the light from the incident portion to the emitting portion. The incident portion has a larger width than the main body portion, and the emitting portion has a larger width than the main body portion.

According to this aspect, the light is condensed in a relatively short area ranging from the incident portion to the main body portion. Thus, loss of the light may be suppressed as compared to a case where the width is gradually decreased from the incident portion to the emitting portion.

A cross-sectional area of the incident portion may be larger than a cross-sectional area of the main body portion, and a cross-sectional area of the emitting portion may be larger than the cross-sectional area of the main body portion. Accordingly, the light of the light source which is incident on the incident portion is condensed between the incident portion and the main body portion. The incident light of the light source hardly leaks out from the side surface of the light guide body in a range from the main body portion to the emitting portion.

A width of a cross-section of the emitting portion in a first direction may be larger than a width of a cross-section of the main body portion in the first direction, and a width of a cross-section of the emitting portion in a second direction crossing the first direction may be smaller than a width of a cross-section of the main body portion in the second direction. Accordingly, the light emitted from the emitting portion is condensed without being diffused too much in the first direction. Meanwhile, the light emitted from the emitting portion is likely diffused to some extent in the second direction.

The emitting portion may include a reflective surface on an extension line of the main body portion, the reflective surface being configured to perform reflection in the second direction. Accordingly, the light is diffused more widely along the second direction.

The incident portion may have a shape which condenses the incident light to the main body portion.

The main body portion may have a maximum width of 5 mm. Accordingly, a more compact vehicle lamp may be achieved.

Further, any combinations of the above described elements, and expressional changes of the present disclosure in a method, a device, and a system are also effective in an aspect of the present disclosure.

According to the present disclosure, it is possible to achieve a compact configuration of efficiently guiding a light incident on an incident portion to an emitting portion The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
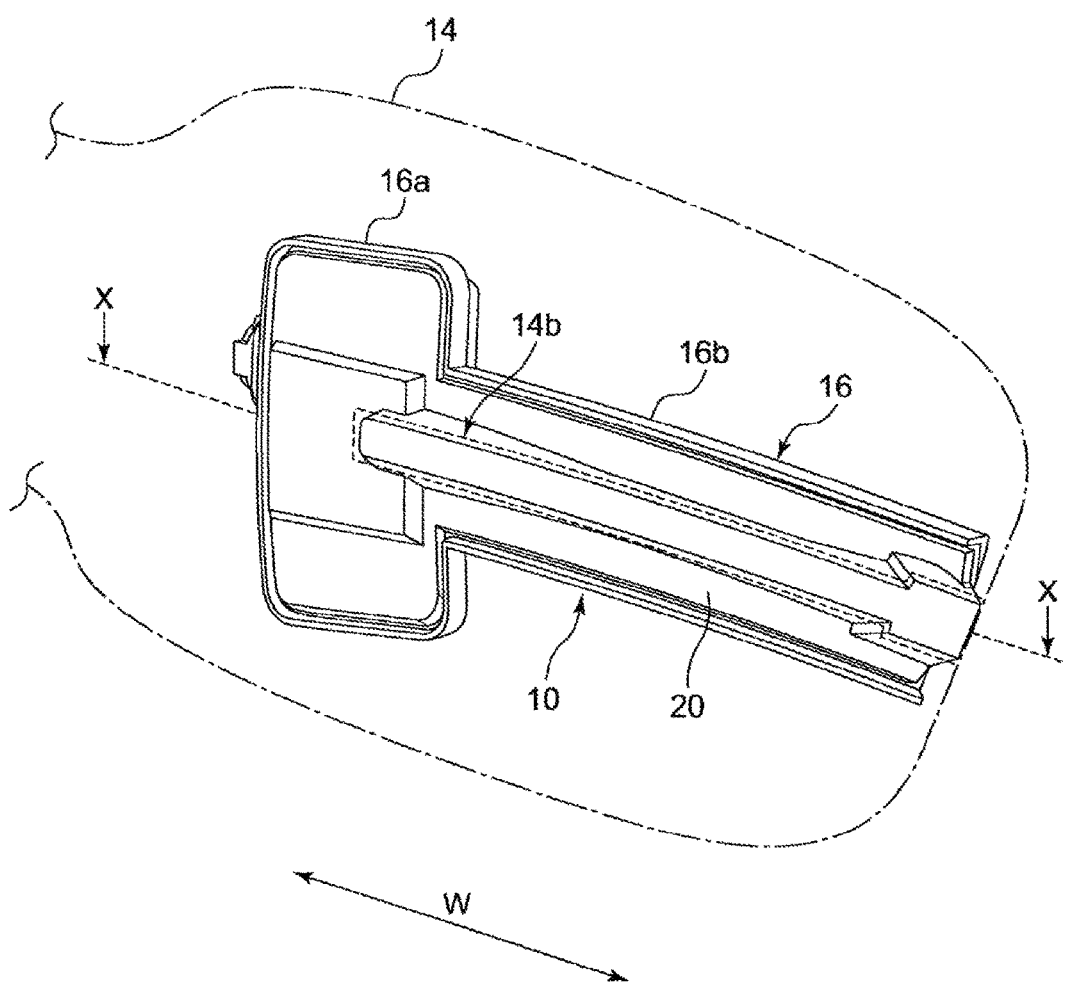
FIG. 1 is a plan view of a side turn signal lamp according to the present exemplary embodiment.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, the present disclosure will be described according to an appropriate exemplary embodiment with reference to drawings. The same or equivalent components, members, and processing illustrated in the drawings are denoted by the same reference numerals, and overlapping descriptions thereof will be properly omitted. The exemplary embodiment is exemplary only without limiting the present disclosure, and all or combinations of the features described in the exemplary embodiment are not necessary in the present disclosure.

Figure 2:
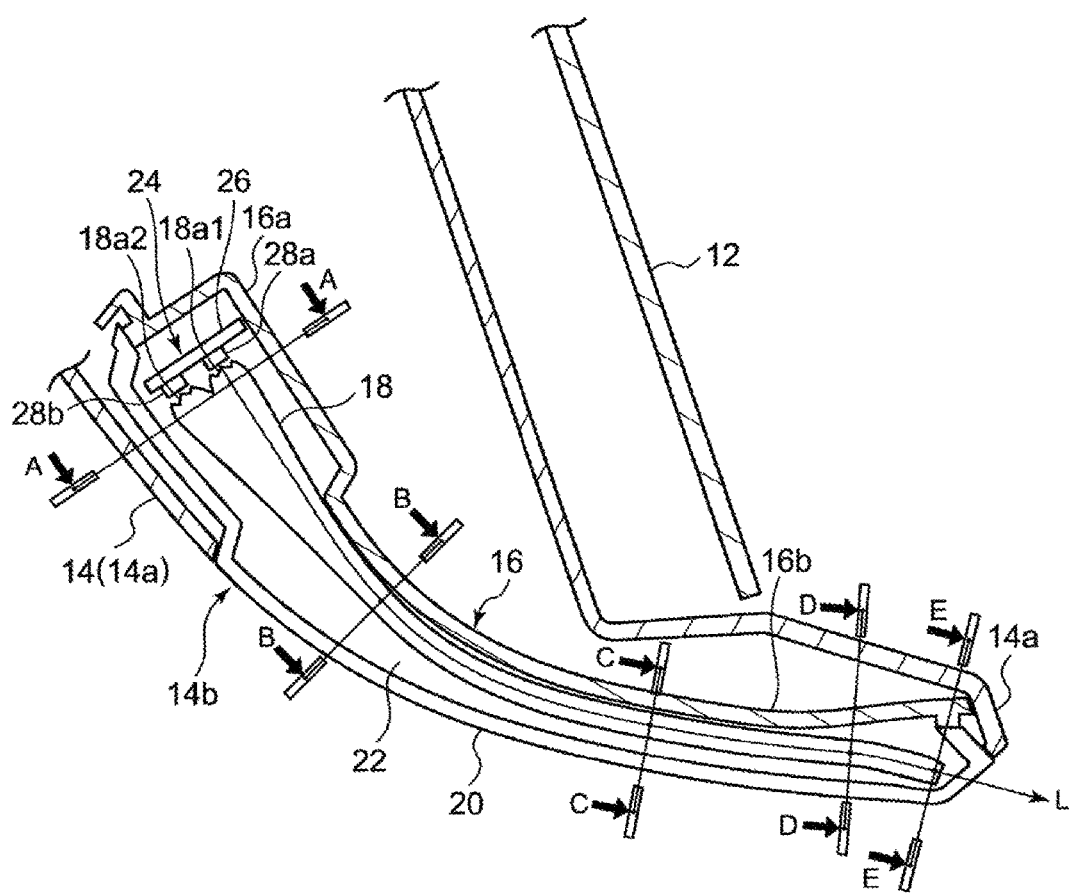
FIG. 2 is a horizontal cross-sectional view along X-X in FIG. 1.
Figure 3A:
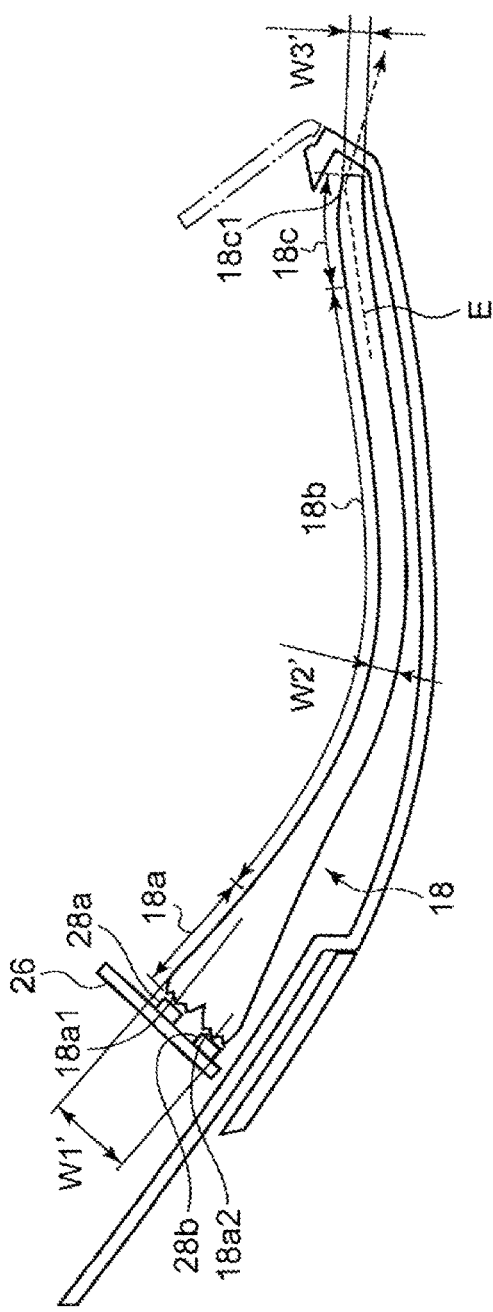
FIG. 3A is a horizontal cross-sectional view of a light guide body according to the present exemplary embodiment.
Figure 3B:
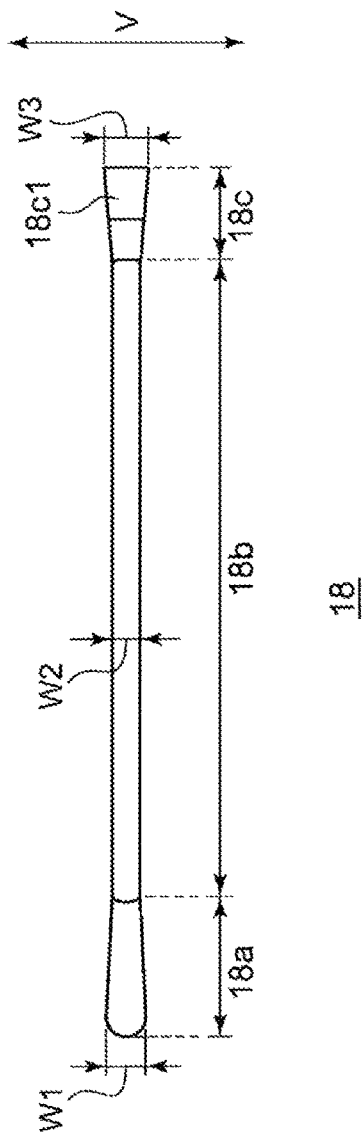
FIG. 3B is a plan view of the light guide body according to the present exemplary embodiment.

In the exemplary embodiment as described below, as a vehicle lamp, a side turn signal lamp will be described as an example. FIG. 1 is a plan view of a side turn signal lamp according to the present exemplary embodiment. FIG. 2 is a horizontal cross-sectional view along X-X in FIG. 1. FIG. 3A is a horizontal cross-sectional view of a light guide body according to the present exemplary embodiment, and FIG. 3B is a plan view of the light guide body according to the present exemplary embodiment. FIGS. 4A to 4E are cross-sectional views illustrating cross-sections along A-A to E-E of FIG. 2.

A side turn signal lamp 10 illustrated in FIG. 1 is provided on an outer wall of a side mirror housing 14 made of a synthetic resin. The side mirror housing 14 is configured to support a main body of a side mirror 12. An elongated opening 14b is provided on a curved outer wall 14a of the side mirror housing 14 to extend in a vehicle width direction W. As illustrated in FIG. 1, the side turn signal lamp 10 has a horizontally long T shape when viewed from the front side and is integrally assembled inside the opening 14b with the vertical rod-shaped portion of the T shape being laid on its side.

The side turn signal lamp 10 includes a lamp body 16 made of a resin, a light guide lens 18 serving as a light guide body, and an outer cover 20. The lamp body 16 includes a wide and shallow container-like base end portion 16a, and a flat distal end portion 16b which has a narrower width than the base end portion 16a, and has a curved rear side. The base end portion 16a and the distal end portion 16b are continued to each other in an arc shape.

A lamp chamber 22 is formed as a space surrounded by the lamp body 16 and the outer cover 20. A light emitting module 24 is accommodated in the vicinity of the base end portion 16a within the lamp chamber 22. Within the lamp chamber 22, the light guide lens 18 is accommodated. The light guide lens 18 has a cross-section formed in a curved shape that follows the curved outer wall 14a of the side mirror housing 14 and substantially matches the shape of the lamp body 16, and is fixed at the periphery of the lamp body 16. The light guide lens 18 is a transparent member, and is made of, for example, an acrylic resin.

The light emitting module 24 includes, for example, two LEDs 28a and 28b mounted on a printed board 26. The light guide lens 18, as illustrated in FIGS. 3A and 3B, includes an incident portion 18a on which light is incident from the LEDs 28a and 28b, an emitting portion 18c which emits the incident light, and a main body portion 18b which guides the light from the incident portion 18a to the emitting portion 18c. The light emitting surfaces of the LEDs 28a and 28b are disposed to face light incident end faces 18a1 and 18a2 of the light guide lens 18, respectively.

The light guide lens 18, as illustrated in the plan view of FIG. 3B, a width W1 (e.g., 5 mm to 6 mm) of a cross-section of the incident portion 18a in a vertical direction V is larger than a width W2 (e.g., 3 mm to 4 mm) of a cross-section of the main body portion 18b in the vertical direction V, and a width W3 (e.g., 5.5 mm to 6.5 mm) of a cross-section of the emitting portion 18c in the vertical direction V is larger than the width W2 of the cross-section of the main body portion 18b in the vertical direction V. The incident portion 18a has a shape that condenses the incident light to the main body portion 18b. Accordingly, the incident light is condensed in a relatively short area ranging from the incident portion 18a to the main body portion 18b. In this case, loss of the light may be suppressed as compared to a case where the width is gradually decreased from the incident portion 18a to the emitting portion 18c.

As illustrated in the horizontal cross-sectional view of FIG. 3A, a width W1' (e.g., 11 mm to 12 mm) of the light incident end faces 18a1 and 18a2 of the incident portion 18a in a horizontal direction (crossing the vertical direction) is larger than a width W2' (e.g., 3 mm to 4 mm) of the main body portion 18b in the horizontal direction, and a width W3' (e.g., 2.5 mm to 3 0 mm) of the emitting portion 18c in the horizontal direction is smaller than the width W2' of the main body portion 18b in the horizontal direction.

Accordingly, the light emitted from the emitting portion 18c is condensed without being diffused too much in the vertical direction. Meanwhile, the light emitted from the emitting portion 18c is likely diffused to some extent in the horizontal direction. Accordingly, in the side turn signal lamp 10 provided with the light guide lens 18, the angle range of the light distribution L as illustrated in FIG. 2 may be set to be large with respect to the axle (e.g., about −5° to 45°), thereby improving the visibility from the vehicle rear side. The main body portion 18b has a maximum width of 5 mm. Accordingly, the side turn signal lamp 10 having a compact configuration provided with the outer cover 20 may be achieved.

Figure 4A:
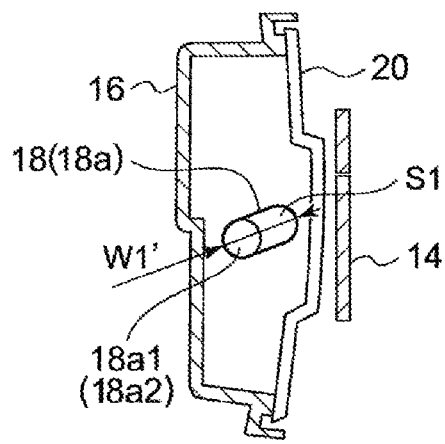
FIGS. 4A to 4E are cross-sectional views illustrating cross-sections along A-A to E-E of FIG. 2.
Figure 4B:
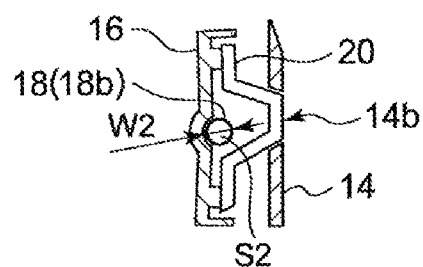
Figure 4C:
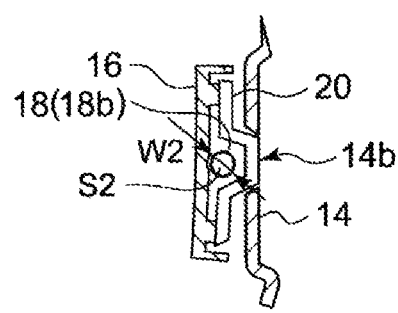
Figure 4D:
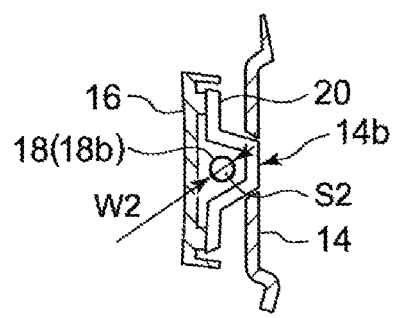
Figure 4E:
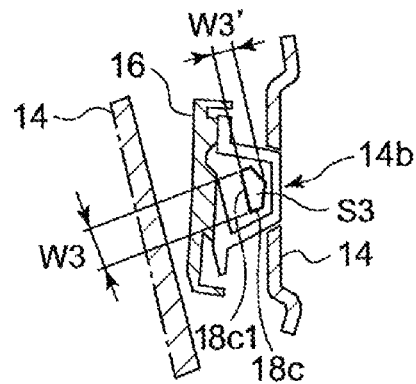

Subsequently, cross-sectional areas of respective portions of the light guide lens 18 will be described. As illustrated in FIG. 4A, the cross-section in the vicinity of the light incident end faces 18a1 and 18a2 of the incident portion 18a has a width W1' (e.g., 11 mm to 12 mm), and a cross-sectional area 51. As illustrated in FIGS. 4B to 4D, the cross-section of the main body portion 18b is circular and has a width (diameter) W2 (e.g., 3 mm to 4 mm), and a cross-sectional area S2. As illustrated in FIG. 4E, the cross-section of the emitting portion 18c is polygonal and has a vertical width W3, a horizontal width W3', and a cross-sectional area S3.

The cross-sectional area S1 of the incident portion 18a is larger than the cross-sectional area S2 of the main body portion 18b. The cross-sectional area S3 of the emitting portion 18c is larger than the cross-sectional area S2 of the main body portion 18b. Accordingly, the LED light incident on the incident portion 18a is condensed between the incident portion 18a and the main body portion 18b. The incident LED light hardly leaks out from the side surface of the light guide lens 18 in a range from the main body portion 18b to the emitting portion 18c. The emitting portion 18c has a reflective surface 18c1 on an extension line E of the main body portion 18b. The reflective surface 18c1 is configured to horizontally reflect at least a part of the light which has passed through the main body portion 18b. Accordingly, the light is diffused more widely along the horizontal direction (the vehicle width direction). Also, the reflective surface 18c1 may be configured to reflect all the light which has passed through the main body portion 18b. In this case, for example, a metallic reflective film may not be provided on the side surface of the light guide lens 18.

As described above, the side turn signal lamp 10 according to the present exemplary embodiment may have a compact configuration in which the light incident on the incident portion 18a is efficiently guided to the emitting portion 18c.

The light guide lens 18 as described above may be used in a lighting device or an indicator lamp as well as the vehicle lamp. The side turn signal lamp 10 as described above is configured as a so-called inner lens type lamp, in which the outer cover 20 is provided outside the light guide lens 18, but may be configured as a so-called outer lens type lamp, in which the light guide lens 18 itself is exposed from the opening 14b of the side mirror housing 14.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle lamp comprising:
   a light guide body,
   wherein the light guide body includes:
      an incident portion on which light is incident from a light source;
      an emitting portion which emits the incident; and
      a main body portion which guides the light from the incident portion to the emitting portion,
      wherein a width of a cross-section of the incident portion in a first direction is larger than a width of a cross-section of the main body portion in the first direction, and a width of a cross-section of the emitting portion in the first direction is larger than a width of a cross-section of the main body portion in the first direction, and
      a width of a cross-section of the incident portion in a second direction crossing first direction is larger than a width of a cross-section of the main body portion in the second direction, and a width of a cross-section of the emitting portion in the second direction is smaller than a width of a cross-section of the main body portion in the second direction.

2. The vehicle lamp of claim 1, wherein a cross-sectional area of the incident portion is larger than a cross-sectional area of the main body portion, and
   a cross-sectional area of the emitting portion is larger than the cross-sectional area of the main body portion.

3. The vehicle lamp of claim 1, wherein the emitting portion includes a reflective surface on an extension line of the main body portion, the reflective surface being configured to perform reflection in the second direction.

4. The vehicle lamp of claim 1, wherein the incident portion has a shape which condenses the incident light to the main body portion.

5. The vehicle lamp of claim 2, wherein the incident portion has a shape which condenses the incident light to the main body portion.

6. The vehicle lamp of claim 3, wherein the incident portion has a shape which condenses the incident light to the main body portion.

7. The vehicle lamp of claim 1, wherein the main body portion has a maximum width of 5 mm.

8. The vehicle lamp of claim 2, wherein the main body portion has a maximum width of 5 mm.

9. The vehicle lamp of claim 3, wherein the main body portion has a maximum width of 5 mm.

10. The vehicle lamp of claim 4, wherein the main body portion has a maximum width of 5 mm.

* * * * *